(12) United States Patent
Deworetzki

(10) Patent No.: US 6,633,813 B1
(45) Date of Patent: Oct. 14, 2003

(54) NAVIGATION SYSTEM FOR SUPPLEMENTARY REPRESENTATION OF DIRECTIONAL INFORMATION

(75) Inventor: Frank Deworetzki, Herborn-Uckersdorf (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/786,491

(22) PCT Filed: Aug. 25, 1999

(86) PCT No.: PCT/EP99/06229

§ 371 (c)(1),
(2), (4) Date: Apr. 20, 2001

(87) PCT Pub. No.: WO00/14481

PCT Pub. Date: Mar. 16, 2000

(30) Foreign Application Priority Data

Sep. 3, 1998 (DE) .......................................... 198 40 120

(51) Int. Cl.⁷ .......................... G01C 21/28; G01C 21/36
(52) U.S. Cl. ...................... 701/209; 701/201; 701/211; 342/443; 342/357.13; 33/349
(58) Field of Search ............................ 701/23, 24, 117, 701/201–215; 342/357.09, 357.13, 357.06, 443; 702/178; 33/349, 1 CC; 379/112.05, 112.01, 112.06

(56) References Cited

U.S. PATENT DOCUMENTS

| | | | | |
|---|---|---|---|---|
| 4,372,052 A | * | 2/1983 | Wakim ................ | 116/DIG. 43 |
| 5,177,685 A | * | 1/1993 | Davis et al. ................ | 340/988 |
| 5,739,772 A | * | 4/1998 | Nanba et al. ................ | 340/990 |
| 5,790,477 A | * | 8/1998 | Hauke ......................... | 368/10 |
| 5,864,305 A | * | 1/1999 | Rosenquist ................ | 340/905 |
| 5,874,905 A | * | 2/1999 | Nanba et al. ................ | 340/995 |
| 5,938,718 A | * | 8/1999 | Morimoto et al. .......... | 701/201 |
| 5,986,575 A | * | 11/1999 | Jones et al. ................. | 340/906 |
| 6,169,955 B1 | * | 1/2001 | Fultz .......................... | 340/988 |
| 6,192,314 B1 | * | 2/2001 | Khavakh et al. ............ | 701/209 |
| 6,321,158 B1 | * | 11/2001 | DeLorme et al. ........... | 340/995 |

FOREIGN PATENT DOCUMENTS

| | | | | |
|---|---|---|---|---|
| DE | 3613422 A1 | 10/1986 | ........... | G01C/21/04 |
| DE | 4304367 A1 | 9/1994 | ........... | B60J/35/00 |
| DE | 4412859 C1 | 11/1994 | ........... | G08G/9/62 |
| EP | 0794408 A2 | 9/1997 | ........... | G01C/21/20 |
| WO | WO 97/19321 | 5/1997 | ........... | G01C/21/20 |

OTHER PUBLICATIONS

Article from ADAC Motorwelt (with translation), dated Nov. 1994.
Brochure from Philips Car Systems, entitled Carin Navigation System, pp. 1–12.

* cited by examiner

Primary Examiner—Thomas G. Black
Assistant Examiner—Ronnie Mancho
(74) Attorney, Agent, or Firm—David M. Thimmig; Mayer, Brown, Rowe & Maw LLP

(57) ABSTRACT

The invention relates to a navigation system for a land vehicle having a measuring arrangement for supplying position, direction and/or distance data, having a data source arrangement for supplying navigation data, having an input arrangement at least for inputting a destination, having a control arrangement at least for determining a route, and having at least one display apparatus for outputting navigation instructions. To free the driver from other actions diverting his attention from the traffic, the control arrangement determines a direction from the calculated position of the land vehicle and a stored position for a prescribed place. The display apparatus additionally displays the direction ascertained by the control arrangement.

12 Claims, 2 Drawing Sheets

US 6,633,813 B1

NAVIGATION SYSTEM FOR SUPPLEMENTARY REPRESENTATION OF DIRECTIONAL INFORMATION

BACKGROUND OF THE INVENTION

The invention relates to a navigation system for a land vehicle having a measuring arrangement for supplying position, direction and/or distance data, having a data source arrangement for supplying navigation data, having an input arrangement at least for inputting a destination, having a control arrangement at least for determining a route, and having at least one display apparatus for outputting navigation instructions.

The navigation system CARiN 520 is known from the leaflet "CARiN NAVIGATION SYSTEM" from Philips Car Systems, 1997. A CD-ROM supplies digitally coded navigation instructions to a control arrangement, for example one designed with a microprocessor. The position data from a GPS system (GPS=Global Positioning System) and the direction data from a gyrocompass are used by the navigation system to ascertain position information about the location of the vehicle. Once a destination has been input, the navigation system calculates the position of the vehicle and the route to be taken and then takes a driver to this destination by means of audio and visual outputs. Such a system enables the driver to head for a destination which he does not know, without knowledge of the place and without reading maps.

SUMMARY OF THE INVENTION

It is an object of the invention to provide a navigation system which makes it possible to free the driver from other actions diverting his attention from the traffic.

The object is achieved by a navigation system of the type mentioned in the introduction in that the control arrangement is provided for determining a direction from the calculated position of the land vehicle and a stored position for a prescribed location, and the display apparatus is provided for additionally displaying the direction ascertained by the control arrangement.

According to the invention, the navigation system determines the direction of a prescribed place, and this direction is displayed on the display apparatus. In this context, the control arrangement ascertains the position of the vehicle, takes the position of the prescribed place from a database, for example, and uses the data to calculate the direction of the place. The control arrangement could, by way of example, calculate the direction of the city of Mecca, and the display apparatus could display the direction of the city of Mecca in the form of an arrow and explanatory further information. The explanatory further information could be the legend "Mecca" or a pictorial representation, for example a stylized mosque.

In addition, the navigation system can also output messages at particular times. By way of example, sunset during the fasting month of Ramadan could be calculated and output. Furthermore, the navigation system could also perform a prescribed action at particular times, such as playing a piece of music.

BRIEF DESCRIPTION OF THE DRAWINGS

An illustrative embodiment of the invention is explained in more detail below with the aid of the FIGURES, in which.

It should be understood that the Figures are not to scale. While some details of and other plan and section views of the preferred embodiment depicting the invention have been omitted, such details are not considered necessary to a full and complete understanding of the invention disclosed and claimed herein. It should also be understood that the present invention is not limited to the preferred embodiment illustrated.

DETAILED DESCRIPTION OF THE PREFERRED EMBODIMENT

Figure 1:
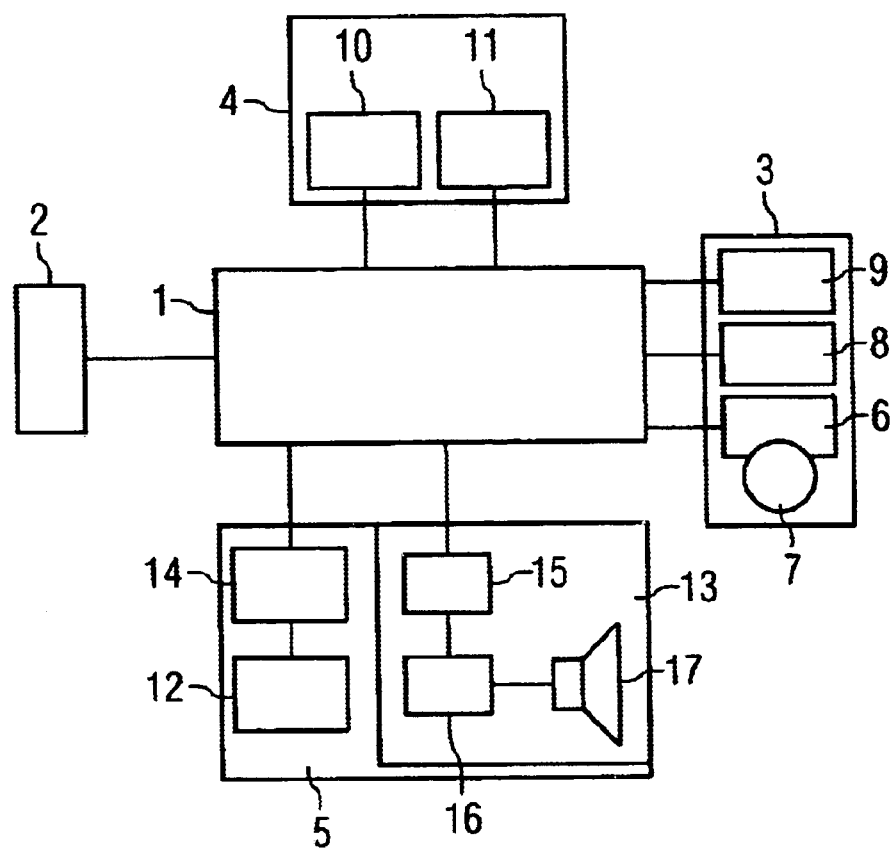
FIG. 1 shows a block diagram of a navigation system for land vehicles.

FIG. 1 shows an illustrative embodiment of a navigation system for land vehicles in the form of a block diagram. The navigation system comprises a control arrangement 1, a measuring arrangement 2, a data source arrangement 3, an input arrangement 4 and an output arrangement 5. By way of example, the control arrangement 1 can comprise a microprocessor which, among other things, performs the navigation calculations and is coupled to at least one read only memory (ROM), for example for executing a program, and to a read/write memory (RAM) for storing data during operation.

The measuring arrangement 2 supplies data to the control arrangement 1 and comprises, by way of example, a tachometer, an electronic compass and a GPS reception unit (GPS=Global Positioning System). The measuring arrangement possibly also comprises wheel sensors which supply direction and distance data to the control arrangement 1 from the left and right front or rear wheels of the vehicle. The direction and distance data are otherwise ascertained from the signals output by the tachometer and the electronic compass. The GPS reception unit uses received satellite data to calculate the present position of the vehicle, and forwards the calculated position data to the control arrangement 1. These position data supplied by the GPS reception unit have an inaccuracy of up to 100 meters.

The data source arrangement 3 comprises at least one apparatus for supplying digitally coded navigation data from a navigation data memory to the control arrangement 1. This 10 apparatus may, by way of example, be a CD-ROM drive 6 which takes data for a particular region (e.g., Germany) from a CD-ROM 7 (navigation data memory). In addition, the data source arrangement 3 can comprise an RDS-TMC receiver 8 (RDS=Radio Data System, TMC=Traffic Message Channel) or a GSM module 9 (GSM=Global System for Mobile Communication), which each receive digitally coded traffic messages and forward them to the control arrangement 1. In addition, the GSM module can also be used to conduct telephone conversations.

The input arrangement 4 comprises a keypad 10 and possibly a trackball 11. A user can enter information manually using the keypad 10 and/or the trackball 11. In this context, the keypad 10 can also be part of a remote control. The information entered by a user (e.g., driver) of the navigation system using the input arrangement 4 also is supplied to the control arrangement 1.

The output arrangement 5 has a display apparatus 12 and a voice output circuit 13. In addition, the display apparatus 12 is driven by means of a drive circuit 14, which is likewise contained in the output arrangement 5. Furthermore, component parts of the voice output circuit 13 are, by way of example, a voice synthesis circuit 15, an amplifier 16 and a loudspeaker 17.

The control arrangement 1 determines a road or route between at least two points (starting point and destination). Before the journey, the user (e.g., driver) needs to enter at least the destination using the input arrangement 4. These entered data are generally also output by the output arrangement 5 for the user to check. During the journey, the control arrangement 1 gives the driver audio or visual instructions via the output arrangement 5. To carry out route planning and give the instructions, for example, the control arrangement 1 uses various software modules. The data (position, direction and distance data) supplied by the measuring apparatus 2 and the data supplied by the data source arrangement 3 are used by the control arrangement 1 to calculate the respective position of a vehicle at the beginning of and during the journey using a position finding software module. A further, route planning module respectively calculates the route to be traveled to the respective destination using the position output by the position finding software module and the destination. In this context, traffic messages can also be taken into account, in order, by way of example, to instruct the driver to bypass a traffic jam. A route indication software module receives the respective position from the position finding software module, various route information from the route planning software module, and possibly also navigation data from the data source arrangement 3. The route indication software module generates control data for voice output and for displaying instructions graphically. It is also possible to display a map section on the display apparatus 12 with the respective indication of position.

The control arrangement 1 conducts a menu-controlled dialog with a user. By way of example, a main menu displayed on the display apparatus 12 may offer the menu items 1) Enter destination
2) Map
3) Location
4) Settings.

A coordinate input system which is part of the keypad 10 is used, by way of example, to select a menu item. Such a coordinate input system may, by way of example, comprise four direction keys and a confirmation key or a trackball. By actuating a direction key, it is possible to change, by way of example, the position of a cursor or of another graphical symbol (e.g., bar representation) on the display apparatus 12. If a particular menu item has been graphically highlighted, for example, using the direction keys, an action is performed once the confirmation key has been actuated.

At the beginning of a journey, a destination will generally first be entered. When the menu item "Enter destination" has been selected in the main menu, a place name first needs to be entered. To do this, the menu item "Place" is selected in the submenu "Enter destination", which, by way of example, comprises the menu items 1) Place
2) Road
3) Delete destination
4) Routing
5) Information on destination
6) Enter destination—map
7) Address book
8) New address
9) Back to main menu.

The display apparatus 12 then displays, by way of example, letters and the menu items "Cancel", "Delete", "Space" (for a space character), "OK", etc. Using the coordinate input system, the place name is selected letter by letter. When the user has fully or partly finished entering the place name, he selects the menu item "OK". The control arrangement 1 checks whether the place name fully or partly entered by the user can be found unambiguously on the CD-ROM 7. If the place name is not available, the user is notified of this, so that he can enter another name. If the entry is ambiguous, a list of place names is shown on the display apparatus 12, and the desired place name can be selected from this list.

Once the place name has been selected, a further menu containing letters and the menu items "Cancel", "Delete", "Space" (for a space character), "OK", etc. is displayed on the display apparatus 12 for selection of a road name. The road name is entered in the same way as the place name.

If the road name is not known, the destination can be entered in another way after the place name has been selected. When the menu item "Enter destination—map" has been selected, the destination can be entered using a map displayed on the display apparatus 12. In this context, a cursor shown on the map on a large map scale can first be used to select the destination area roughly, and the map scale can be reduced step by step until the desired destination has been found.

Once the place name has been selected, the destination can also be entered using a list which indicates particular destination categories. In the submenu "Enter destination", the menu item "Information on destination" then needs to be selected. Once this menu item has been selected, a list containing various categories is shown on the display apparatus 12. These may be, by way of example: hotels, restaurants, sights, car parks, filling stations, railroad stations or museums. Once a category has been selected, a further list containing various selection options within the category is shown. In the category "Hotels", for example, a particular hotel representing the destination can be selected.

In addition, there is the option of using an address book, in which personal destinations are stored, by selecting the menu item "Address book". A new destination can be entered using the menu item "New address". Entry for the address book proceeds as described above for entry of the place name and the road name.

A place name and road name which have been entered, for example, as a destination are deleted using the menu item "Delete destination". For the control arrangement 1 to be able to perform route planning when the destination has been entered, the user needs to select the menu item "Routing". The display apparatus 12 then changes to the submenu "Routing", which offers various display modes (e.g., map display). Using the selected display mode, navigation instructions intended to complement the voice instructions are then given to the driver during the journey.

Figure 2:
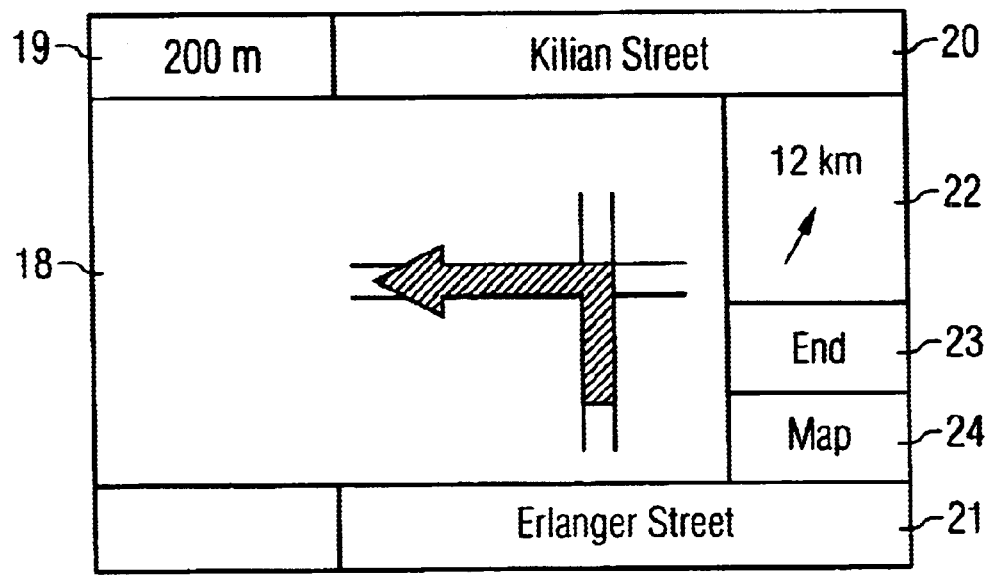
FIGS. 2 and 3 show illustrations of a display apparatus in the navigation system.

FIG. 2 shows an illustration of a display mode on the display apparatus 12 during the journey to the selected destination (routing). In the picture shown in FIG. 2, various information is presented to the driver in various areas of the picture. In a central area 18 of the picture, the direction of travel is displayed. In the example shown in FIG. 2, an intersection with an arrow bending off to the left is shown. In the top part of the picture, a distance (200 m) is depicted in an area 19 on the left, and a destination (Kilian Street) is depicted in an area 20 situated next to that on the right. In a bottom area 21 of the picture, the present position (Erlanger Street) is shown. In an area 22 on the right of the picture, the distance to the destination (12 km) is shown by an arrow indicating the direction of the destination. Two further areas 23 and 24 below that contain the legends or menu items "End" and "Map". Selecting the menu item "End" returns to the main menu, for example. If the menu item "Map" is selected, the map display mode is retrieved. Thus, the example picture on the display apparatus 12 in FIG. 2 informs the driver that he is on Erlanger Street and needs to turn left into Kilian Street after 200 m to arrive at his destination after 12 km.

Other menu items (map, location, settings), not explained in more detail here, can be chosen from the main menu. When such a menu item has been called, a further submenu is displayed.

According to the invention, the navigation system can also be used to display particular directions for selected places. This may also be linked to messages at prescribed times. By way of example, during routing, the display apparatus 12 may also contain an indication of the direction to the city of Mecca for Muslims.

Figure 3:
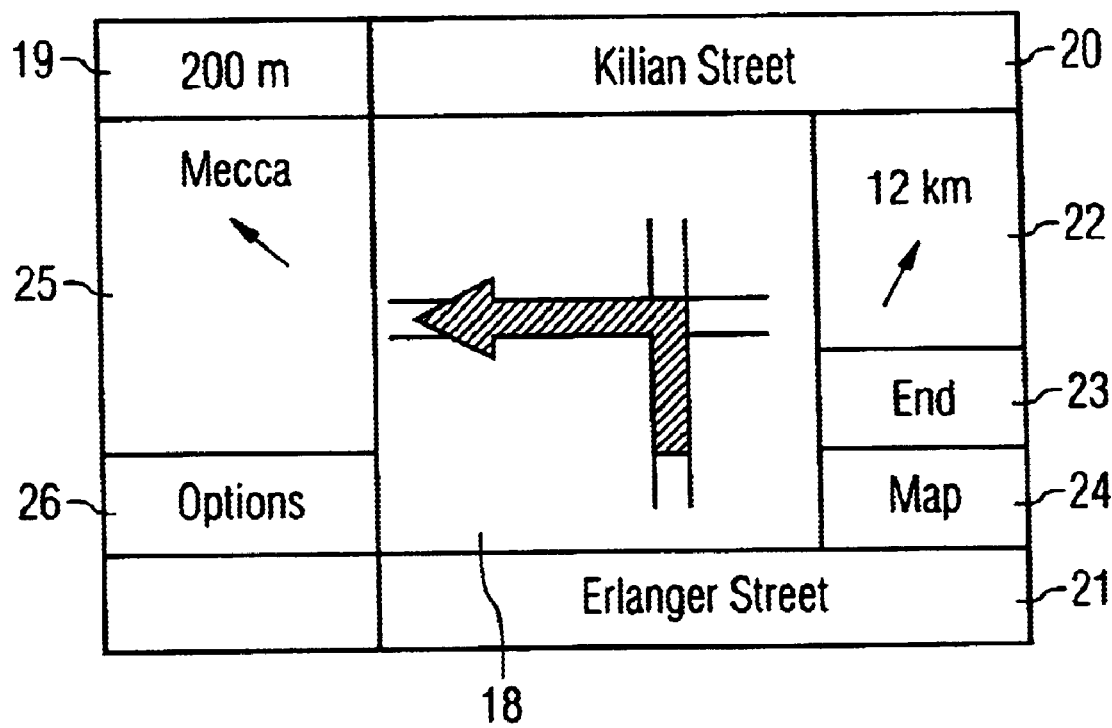

FIG. 3 shows another illustration of a display mode on the display apparatus 12 with a direction for the city of Mecca during routing. Besides the picture areas 18 to 24 explained above with reference to FIG. 2, the picture shown in FIG. 3 contains a direction for the city of Mecca in an area 25 on the left of the picture. This direction contains an arrow, pointing in the direction of the city of Mecca, and the name Mecca. It is also possible to display a stylized mosque or other symbols for the city of Mecca as the name itself in the area 25. Below this area 25 is another area 26, which contains the legend or the menu item "Options". If this menu item is selected, a submenu is displayed.

Figure 4:
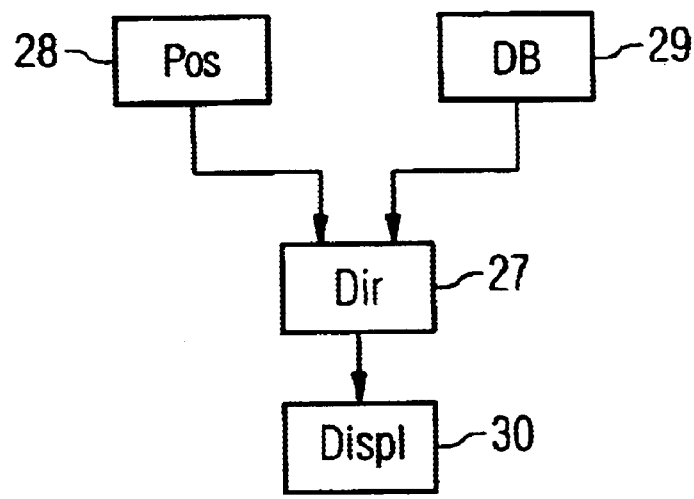
FIG. 4 shows a flowchart for ascertaining the direction of a prescribed place.

To provide an additional direction instruction, the route indication software module contains an extension. This module extension can be explained using the flowchart shown in FIG. 4. A block 27 (Dir) receives information about the position of the vehicle from the a position finding module. This is indicated by a block 28 (Pos). The block 27 receives position information about the city of Mecca from a database located on the CD-ROM 7, for example. This is indicated by a block 29 (DB). The block 27 uses the position information to calculate the direction of the city of Mecca in relation to the longitudinal axis of the vehicle. The direction resulting from this calculation is processed for display purposes by a module 30 (Displ).

The direction information for the city of Mecca may also be linked to a time function. In the submenu "Options", the driver can specify times of day, for example, at which he will receive a message requesting him to stop. This message could be indicated audibly and visually, for example below the direction in area 25. In addition, the submenu "Options" can also contain a selection of music titles which are played from a CD during a stop. Furthermore, a menu item "Ramadan" may also be included. After retrieving this menu item, the driver enters the beginning or the end of the fasting month of Ramadan. The navigation system then uses the position indicated for the vehicle to ascertain sunrise and sunset during the fasting month of Ramadan. This can then again be indicated audibly and visually.

Although reference has been made, for the purpose of explanation, to a preferred embodiment: of a navigation system for additionally displaying direction information, it should be understood that any of a variety of components and suitable materials of construction may be used to satisfy the particular needs and requirements of the end user. It will be apparent to those skilled in the art that modifications and variations can be made in the design and construction of the navigation system without departing from the scope or spirit of the invention. Other embodiments of the invention will be apparent to those skilled in the art from consideration of the specification and practice of the invention disclosed herein.

What is claimed is:

1. A navigation system for a land vehicle having a measuring arrangement for supplying position, direction and/or distance data, having a data source arrangement for supplying navigation data comprising map and/or road data, having an input arrangement at least for inputting a destination and a further prescribed place, having a control arrangement at least for determining a route to be followed based on a sequence of roads between a starting point and the destination, and having at least one display apparatus for outputting navigation instructions based on the route to be followed to the destination, wherein the control arrangement is provided for also determining a direction from a present calculated position of the land vehicle to the position for the further prescribed place, and wherein the display apparatus is adapted to simultaneously display the direction ascertained by the control arrangement to the further prescribed place and at least a portion of the navigation instructions for the route to be followed to the destination.

2. The navigation system as claimed in claim 1, wherein the control arrangement is provided for determining the direction from a present calculated position of the land vehicle to a city inputted as the further prescribed place, and the display apparatus is provided for displaying the direction to the city in the form of an arrow and explanatory further information.

3. The navigation system as claimed in claim 2, wherein the city is the city of Mecca.

4. The navigation system as claimed in claim 1, wherein the control arrangement is provided for producing messages or for performing prescribed actions at chosen times and the display apparatus is provided for displaying the messages.

5. A navigation system for a land vehicle having a measuring arrangement for supplying position, direction and/or distance data, having a data source arrangement for supplying navigation data comprising map and/or road data, having an input arrangement at least for inputting a destination and a further prescribed place, having a control arrangement at least for determining a route to be followed based on a sequence of roads between a starting point and the destination, and having an output arrangement for outputting audio or visual navigation instructions for the route to be followed to the destination, wherein the output arrangement comprises at least one display arrangement, wherein the control arrangement is provided for also determining a direction from a present calculated position of the land vehicle to the position for the further prescribed place, and wherein the display arrangement is adapted to simultaneously display the direction ascertained by the control arrangement to the further prescribed place and at least a portion of the audio or visual navigation instructions for the route to be followed to the destination.

6. The navigation system as claimed in claim 5, wherein the control arrangement is provided for determining the direction from a present calculated position of the land vehicle to a city inputted as the further prescribed place, and the display arrangement is provided for displaying the direction to the city in the form of an arrow and explanatory further information.

7. The navigation system as claimed in claim 6, wherein the city is the city of Mecca.

8. The navigation system as claimed in claim 5, wherein the control arrangement is provided for producing messages or for performing prescribed actions at chosen times and the display arrangement is provided for displaying the messages.

9. A navigation system for a land vehicle having a measuring arrangement for supplying position, direction and/or distance data, having a data source arrangement for supplying navigation data comprising map and/or road data, having an input arrangement at least for inputting a destination and a further prescribed place, having a control arrangement at least for determining a route to be followed based on a sequence of roads between a starting point and the destination, and having at least one display apparatus for outputting navigation instructions based on the route to be followed to the destination, wherein the control arrangement is provided for also determining a direction from a present calculated position of the land vehicle to the position for the further prescribed place, and wherein the display apparatus has multiple display areas and is adapted to simultaneously display at least a present direction of travel in one display area, the destination in a second display area, and the direction ascertained by the control arrangement to the further prescribed place in a third display area.

10. The navigation system as claimed in claim 9, wherein the control arrangement is provided for determining the direction from a present calculated position of the land vehicle to a city inputted as the further prescribed place and the display apparatus is provided for displaying the direction to the city in the form of at least an arrow.

11. The navigation system as claimed in claim 10, wherein the city is the city of Mecca.

12. The navigation system as claimed in claim 9, wherein the control arrangement is provided for producing messages or for performing prescribed actions at chosen times and the display apparatus is provided for displaying the messages.

* * * * *